United States Patent [19]
Kitazawa et al.

[11] Patent Number: 6,081,051
[45] Date of Patent: Jun. 27, 2000

[54] LINEAR/ROTARY ACTUATOR AND WINDING MACHINE INCLUDING SAME

[75] Inventors: Kazuyuki Kitazawa; Hiroshi Ooki; Yutaka Takeuchi; Shigeto Murata, all of Tokyo, Japan

[73] Assignee: Sanyo Denki Co., Ltd., Tokyo, Japan

[21] Appl. No.: 09/212,030

[22] Filed: Dec. 15, 1998

[30] Foreign Application Priority Data

May 13, 1998 [JP] Japan .................................. 10-130024

[51] Int. Cl.⁷ ...................................................... H02K 7/06
[52] U.S. Cl. ................................................ 310/20; 310/12
[58] Field of Search .................................. 310/12, 20, 80; 74/89.15

[56] References Cited

FOREIGN PATENT DOCUMENTS 296308 11/1993 Japan .
292343 10/1994 Japan .

OTHER PUBLICATIONS

JP Patent Application Laid–open Publication No. 3650/1993 Jan.
JP Patent Application Laid–open Publication No. 303737/1994 Oct.

*Primary Examiner*—Nestor Ramirez
*Assistant Examiner*—Judson H. Jones
*Attorney, Agent, or Firm*—Pearne & Gordon LLP

[57] ABSTRACT

A linear/rotary actuator capable of carrying out both linear motion and rotary motion either individually or concurrently as desired while controlling both motions as desired. A rotary driving motor includes a hollow shaft. When the rotary driving motor rotates a third nut fitted on a spline section of the rotary driving motor, an output shaft rotatably fitted on a linear shaft through bearings is rotated. The linear shaft 21 is provided thereon with a threaded section. A spline section and a first nut is threadedly fitted on the threaded section and a second nut kept stationary is fitted on the spline section. The first nut is rotated while being fixed in a hollow shaft of a linear driving motor. Rotation of the linear driving motor leads to rotation of the first nut, resulting in the linear shaft 21 being linearly moved in an axial direction thereof, so that the output shaft may be linearly moved.

23 Claims, 8 Drawing Sheets

LINEAR/ROTARY ACTUATOR AND WINDING MACHINE INCLUDING SAME

BACKGROUND OF THE INVENTION

This invention relates to a linear/rotary actuator and a winding machine including the same, and more particularly to a linear/rotary actuator suitable for driving a machine or equipment carrying out both linear motion and rotary motion such as an arm of a robot or a nozzle of a winding machine and a winding machine including the same.

Driving of, for example, an arm of a robot, a nozzle of a winding machine or the like often requires an actuator constructed so as to carry out linear motion and rotary motion not only individually (linear/rotary uniaxial motion) but concurrently (linear/rotary biaxial motion). Actuators for such biaxial motion include two type of actuators. One of them is a linear/rotary actuator of the type that simply an actuator for linear motion and that for rotary motion are combined with each other and more particularly a rotary driving motor and a linear driving motor are independently arranged so as to transmit power through a complicated transmission mechanism to a single output shaft to carry out rotary/linear biaxial motion. The other actuator is a linear/rotary actuator of the type that a rotary driving motor and a linear driving motor are linearly arranged to directly carry out rotary driving of an output shaft or linear driving thereof without using any complicated transmission mechanism. The actuator of the latter type is disclosed in, for example, in Japanese Patent Application Laid-Open Publication No. 296308/1993, wherein two motors linearly arranged in juxtaposition to each other so as to define an axis of the actuator by cooperation with each other permit a single output shaft to carry out linear/rotary biaxial motion. Both former and latter linear/rotary actuators are disclosed in Japanese Patent Application Laid-Open Publication No. 292343/1994.

The linear/rotary actuator disclosed in Japanese Patent Application Laid-Open Publication No. 292343/1994 is so constructed that a single output shaft is formed with both a ball screw and a spline. The ball screw and spline are driven either through a transmission mechanism or directly by means of both a rotary driving motor and a linear driving motor. Unfortunately, such construction of the linear/rotary actuator disclosed causes a problem that the output shaft carries out linear motion with rotation of a rotor of the rotary driving motor when a rotor of the linear driving motor is kept interrupted during rotary motion. In order to solve the problem, it is required to control the linear driving motor in coordination with the rotary driving motor during rotation thereof. This renders control of both motors highly troublesome and complicated and leads to both a failure in control and misregistration in control.

Also, the above-described latter linear/rotary actuator disclosed in Japanese Patent Application Laid-Open Publication No. 296308 is so constructed that the single output shaft described above is adapted to carry out both rotary motion and linear motion and formed with a ball screw and a spline. The ball screw is threadedly engaged with a nut driven for rotation through the linear driving motor and the spline is linearly movably fitted in a groove of a shaft driven for rotation through the rotary driving motor. Driving of the linear driving motor rotates the nut, leading to linear motion of the output shaft, whereas driving of the rotary driving motor leads to rotation of the output shaft through the shaft. Such construction of the linear/rotary actuator permits it to be relatively simplified in structure and reduced in whole size. However, the linear/rotary actuator causes linear motion and rotary motion to be mechanically synchronized with each other, to thereby fail to individually carry out linear motion and rotary motion. For example, it fails in execution of only rotary motion, because the ball screw is rotated relatively to the nut, to thereby fail to rotate the output shaft while holding it against linear motion. Likewise, it fails to concurrently carry out both linear motion and rotary motion because it ensures linear motion in only one direction but causes a reduction in speed of linear motion in the other direction or fails in linear motion in the other direction. Such a restriction fails to permit the linear/rotary actuator to satisfactorily exhibit general-purpose properties.

Also, the conventional linear/rotary actuator fails to optionally and positively carry out linear motion and rotary motion, leading to a failure to permit so-called box motion (linear motion, rotation, linear motion and rotation) as required in operation of a nozzle of a winding machine to be repeatedly executed at an increased speed.

SUMMARY OF THE INVENTION

The present invention has been made in view of the foregoing disadvantage of the prior art.

Accordingly, it is an object of the present invention to provide a linear/rotary actuator which is capable of attaining linear motion and rotary motion either concurrently or individually while readily and positively controlling them.

It is another object of the present invention to provide a linear/rotary actuator which includes a rotary driving motor and a linear driving motor arranged so as to define an axis of the actuator by cooperation with each other and is capable of readily and positively carrying out linear motion and rotary motion either concurrently or individually.

It is a further object of the present invention to provide a linear/rotary actuator which is suitable for driving a nozzle of a winding machine.

It is still another object of the present invention to provide a winding machine which includes a linear/rotary actuator exhibiting increased controllability and compacted in structure.

The principle of the present invention is that either an output shaft of a linear/rotary actuator fitted through bearings on a linear shaft linearly moved due to driving of a linear driving motor while being axially aligned therewith is rotated due to driving of a rotary driving motor or the linear shaft fitted through the bearings on the output shaft rotated due to driving of the rotary driving motor while being axially aligned therewith is linearly moved by driving of the linear driving motor to permit the output shaft, so that the output shaft may carry out both linear motion and rotary motion.

In order to rotate the output shaft by driving of the rotary driving motor, the output shaft is provided thereon with a spline section, on which a nut is fitted. The nut is rotated directly or through a transmission mechanism by means of the rotary driving motor. The linear driving motor for driving the linear shaft may be either a rotary type motor or a linear motor. When the linear driving motor is of the rotary type, the linear shaft is provided with a spline section and a threaded section, on which a nut is threadedly fitted. Then, the nut fitted on the threaded section is rotated directly or through a transmission mechanism by the linear driving motor, to thereby carry out linear motion of the linear shaft. A nut fitted on the spline section is kept stationary. The rotary driving motor and linear driving motor each are suitably selected from a servo motor and a step motor, because they exhibit enhanced controllability. Whereas, when a linear motor is used for this purpose, the linear shaft is directly driven as a movable element of the linear motor.

The term "spline section" referred to herein means a mechanism or structure which permits movement of a shaft in an axial direction thereof. The spline section is fitted thereon with a nut called a spline nut. The spline section keeps the shaft from being rotated when the spline nut is kept locked or fixed. When the nut is rotated due to application of force for rotation thereto while being kept unfixed, the spline section functions to transmit the force to the shaft. The spline section may be in the form of either grooves or projections. The nut fitted on the spline section is securely engaged with the spline section, to thereby be prevented from rotating around the shaft. The term "threaded section" referred to herein involves a ball screw. It is not limited to any specific screw so long as it is formed in a spiral manner on an outer periphery of the shaft. The nut fitted on the threaded section is constructed so as to be threadedly moved along the threaded section due to application of rotational force thereto. The spline section and threaded section of the linear shaft may be constituted by a so-called "ball screw/spline", wherein the threaded section and spline section are overlappedly arranged on the same portion of the linear shaft so as not to interfere with each other. Such a ball screw/spline permits a length of the linear shaft in an axial direction thereof to be reduced.

According to the principle of the present invention, the linear shaft and output shaft are arranged coaxially with each other, so that the linear-rotary actuator may be simplified and compacted in structure. Also, linear motion of the linear shaft and rotary motion of the output shaft are reliably controlled in a manner to be independent from each other.

Thus, in accordance with the present invention, a linear/rotary actuator is provided, which is generally constructed so that a rotary driving motor and a linear driving motor are arranged in juxtaposition to each other so as to define an axis of the linear/rotary actuator by cooperation with each other and each include a shaft, and an output shaft is rotated about the axis due to rotation of the shaft of the rotary driving motor and is linearly moved along the axis due to rotation of the shaft of the linear driving motor.

Now, fitting of the output shaft on a linear shaft will be described.

The shafts of the rotary driving motor and linear driving motor are constructed into a hollow structure. The linear shaft is formed on an outer periphery thereof with a spline section and a threaded section and arranged so as to be axially aligned with the shafts of the rotary driving motor and linear driving motor. More specifically, the spline section is arranged so as to extend in an axial direction of the linear shaft and therefore an axial direction of the linear/rotary actuator. The threaded section is arranged so as to extend in a spiral manner about the axis. A first nut is fitted on the threaded section of the linear shaft and rotated through the shaft of the linear driving motor to displace the linear shaft along the axis. A second nut (spline guide member) is fitted on the spline section of the linear shaft to prevent rotation of the linear shaft while being kept fixed. The second nut may be fixed on a frame of the motor, an end bracket or the like. The output shaft is formed on an outer periphery thereof with a spline section and constructed into a hollow structure. The output shaft is rotatably fitted on a portion of the linear shaft positioned at a central portion of the shaft of the rotary driving motor through bearings. The output shaft is rotated about the linear shaft but is not slid on the linear shaft along the axis. A third nut or spline guide member is mounted in the shaft of the rotary driving motor and fitted on the spline section (second spline section) of the output shaft. More specifically, the third nut is fixed in the shaft of the rotary driving motor.

In the linear/rotary actuator thus constructed, driving of the linear driving motor A permits the first nut to be rotated on the threaded section of the linear shaft, resulting in the linear shaft carrying out linear motion in the axial direction. However, the linear shaft is kept from being rotated because the spline section of the linear shaft is fitted in the second nut (spline guide member) kept fixed. Driving of the rotary driving motor leads to rotation of the output shaft. In this instance, the output shaft carries out linear motion while carrying out rotary motion, because the third nut (spline guide member) fitted in the shaft of the rotary driving motor is fitted on the spline section of the output shaft. The output shaft and linear shaft are rotatably fitted on each other through the bearings so as not to be slid in relation to each other. This permits the output shaft to carry out linear motion with linear motion of the linear shaft and keeps the linear shaft from being rotated with rotation of the output shaft. This results in rotation of the output shaft being controlled while being kept from being synchronous with the linear motion, so that the linear/rotary actuator of the present invention may exhibit increased general-purpose characteristics and be simplified and compacted in structure. Synchronism between the linear motion and the rotary motion may be carried out by mounting rotation detectors (encoders) on the linear driving motor and rotary driving motor and making both motors electrically synchronous with each other depending on outputs of the rotation detectors.

Now, partial fitting of the linear shaft on the output shaft will be described.

The linear shaft is constructed into a hollow structure. The output shaft is constituted of a fit section fitted in the linear shaft and an output section formed on an outer periphery thereof with a spline section and positioned outside the linear shaft. The fit section of the output shaft is rotatably fitted in the linear shaft through bearings. In other words, the linear shaft is rotatably fitted on the fit section of the output shaft through the bearings while being axially aligned therewith. The remaining part may be constructed in substantially the same manner as described above.

In either case, the spline section and threaded section of the linear shaft may be overlappedly formed on the same portion of the linear shaft so as not to interfere with each other. This leads to a reduction in length of the linear shaft.

For the purpose of permitting a wire feed nozzle to carry out linear motion and rotary motion, two such linear/rotary actuators as described above may be incorporated in a winding machine. This results in a mechanism section of the winding machine being highly simplified in structure. In application of two such linear/rotary actuators to driving of a nozzle of the winding machine, addition of a mechanism for smoothly guiding a wire to the nozzle is preferable. In this instance, one of the actuators is so constructed that the linear shaft is formed with a wire guide through-hole so as to extend in an axial direction thereof and the output shaft is formed at an outer end thereof with a wire outlet in a manner to be aligned with the wire guide through-hole. In the other linear/rotary actuator, the output shaft is formed with a wire guide through-hole so as to extend in an axial direction thereof. Such arrangement permits the wire to be fed to the nozzle through the linear/rotary actuators, to thereby simplify a structure of the winding machine and eliminate drawing-around of the wire.

A linear motor may be used for the linear driving motor in the linear/rotary actuator of the present invention. In this instance, the shaft of the rotary driving motor is constructed into a hollow structure. The linear shaft is constituted by a movable element of the linear motor. The linear shaft is arranged so as to be aligned with the axis and extend through a central portion of the rotary driving motor. The output shaft is formed on an outer periphery thereof with a spline section and constructed into a hollow structure. The output shaft is rotatably fitted on a portion of the linear shaft positioned at a central portion of the shaft of the rotary driving motor through bearings. The shaft of the rotary driving motor is fixedly mounted therein with a nut, which is fitted on the spline section of the output shaft.

Use of the linear motor for the linear driving motor permits the linear shaft to be directly driven without any spline section and threaded section, so that the linear/rotary actuator may be highly simplified in structure. In particular, use of a linear motor of the cylinder type having a movable element arranged in a stator for this purpose permits the linear driving motor and rotary driving motor to be integrated together, so that the linear/rotary actuator may be compacted in structure.

The present invention may be applied to a structure wherein driving force outputted from the rotary driving motor and linear driving motor is transmitted through first and second transmission mechanisms to the linear shaft and output shaft, respectively. In this instance, the linear driving motor rotates the first nut threadedly fitted on the threaded section of the linear shaft through the first transmission mechanism, to thereby displace the linear shaft in the axial direction. The rotary driving motor rotates the third nut fitted on the spline section of the output shaft through the second transmission mechanism, to thereby rotate the output shaft. Use of the linear motor for the linear driving motor eliminates arrangement of any transmission mechanism for the linear driving motor, thus, it is merely required to arrange the transmission mechanism on a side of the rotary driving motor.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, the present invention will be described hereinafter with reference to the accompanying drawings.

Figure 1:
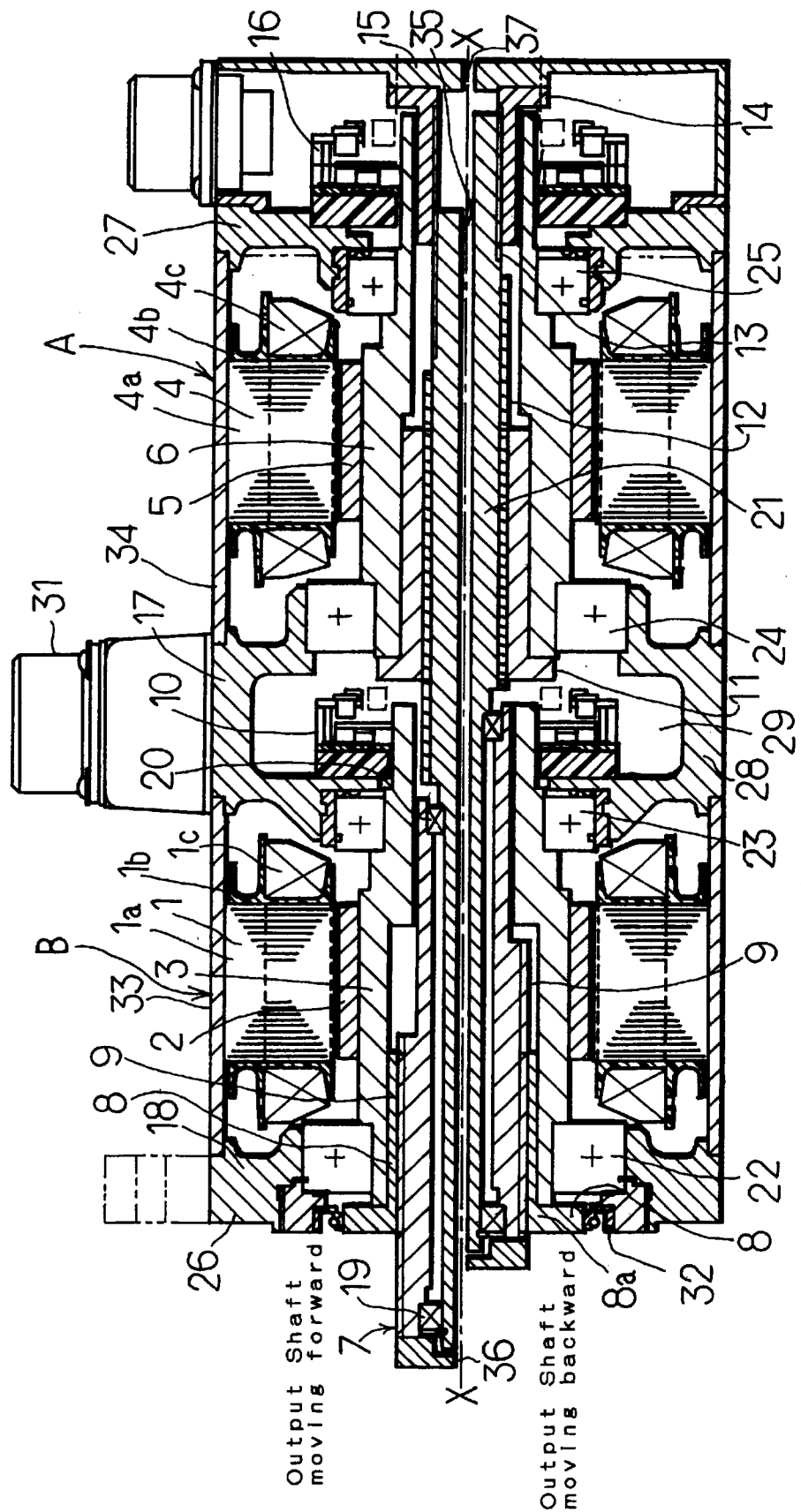
FIG. 1 is a cross-sectional view showing an embodiment of a linear/rotary actuator according to the present invention.

Referring first to FIG. 1, an embodiment of a linear/rotary actuator according to the present invention is illustrated, in which a state where an output shaft is extended in a forward direction, which is left in FIG. 1, is shown above an axis X—X of the linear/rotary actuator in FIG. 1, and a state where the output shaft is retracted in a backward direction, which is right in FIG. 1, is shown below the axis X—X of the linear/rotary actuator in FIG. 1. The linear/rotary actuator of the illustrated embodiment generally includes a linear driving motor A and a rotary driving motor B linearly arranged in juxtaposition to each other in a manner to define the axis X-X of the linear/rotary actuator by cooperation with each other. In the illustrated embodiment, a servo motor is used as each of the linear driving motor A and rotary driving motor B. The rotary driving motor B includes a stator 1 and a rotor 2 and the linear driving motor A includes a stator 4 and a rotor 5. The stators 1 and 4 include cores 1a and 4a, insulators 1b and 4b, and coils 1c and 4c as in a conventional servo motor, respectively. Likewise, the rotors 2 and 5 each are constructed in such a manner as known in the art, except that shafts 3 and 6 are constructed into a hollow structure. The hollow shafts 3 and 6 are arranged so as to be coaxial with each other and constructed so as to be rotated with the rotors 2 and 5, respectively.

The stators 1 and 4 are fixed on an inner peripheral surface of covers 33 and 34 of a cylindrical configuration, respectively. The covers 33 and 34 are formed into substantially the same radius. The cover 33 is fitted on both ends thereof with an end brackets 26 and intermediate bracket 28 and the cover 34 is likewise fitted on both ends thereof with an end bracket 27 and the intermediate bracket 28, respectively. Thus, the covers 33 and 34 are supported at an inner end thereof on the intermediate bracket 28 in common. The stator 1 of the rotary driving motor B is arranged between the end bracket 26 and the intermediate bracket 28 and the stator 4 of the linear driving motor A is arranged between the end bracket 27 and the intermediate bracket 28. The shaft 3 of the rotary driving motor B is rotatably supported in the end bracket 26 and intermediate bracket 28 through a pair of bearings 22 and 23. The shaft 6 of the linear driving motor A is rotatably supported in the end bracket 27 and intermediate bracket 28 through a pair of bearings 24 and 25.

Thus, the illustrated embodiment is so constructed that the intermediate bracket 28 is arranged in common to both rotary driving motor B and linear driving motor A. Such construction reduces the number of parts of the actuator and a whole length of the actuator in an axial direction thereof.

The intermediate bracket 28 is formed therein with a receiving space 29, in which a first encoder 10 is arranged for detecting rotation of the rotary driving motor B. The bracket 27 is fixedly mounted thereon with an encoder cover 15, in which a second encoder 16 is received for detecting rotation of linear driving motor A. The shaft 3 of the rotary driving motor B is arranged so as to extend into the space 29 of the intermediate bracket 28 and is securely mounted on an end thereof with a rotary element of the first encoder. Likewise, the shaft 6 of the linear driving motor A is arranged so as to extend into the encoder cover 15 and is fixedly mounted on an end thereof with a rotary element of the second encoder 16.

Such formation of the receiving space 29 in the intermediate bracket 28 eliminates a necessity of independently arranging the first encoder 10. This restrains or minimizes an increase in a length or dimension of the actuator in the axial direction thereof in spite of the construction of the illustrated embodiment that the motors A and B are linearly arranged so as to be coaxial with each other and the encoder is arranged for each of the motors.

The intermediate bracket 28 is also provided thereon with a lead wire lead-out section 31 of a coupler structure or a connector structure through which a lead wire (not shown) extending from each of the linear driving motor A and rotary driving motor B is electrically led out, so that the lead wires for feeding electric power to the motors A and B may be led out at a single location, to thereby facilitate electrical connection of the lead wires at an exterior. Also, in the illustrated embodiment, an output of the first encoder 10 is led out of the intermediate bracket 28 and an output of the second encoder 16 is led out of the encoder cover 15.

Reference numeral 21 designates a linear shaft arranged so as to extend through a center of the rotor 2 of the rotary driving motor B and that of the rotor 5 of the linear driving motor A and therefore so as to be aligned with the axis X—X of the linear/rotary actuator. The linear shaft 21 is formed on an outer peripheral portion of both one end and an intermediate portion thereof with a spline section 13 and a threaded section 12, respectively. The spline section 13 is constituted of a plurality of spline grooves formed on the linear shaft 21 so as to extend in an axial direction thereof and the threaded section 12 is constituted of a ball screw spirally formed on the linear shaft 21. Reference numeral 11 designates a first nut, which is fixedly fitted in the shaft 6 of the linear driving motor A. The first nut 11 is formed on an inner periphery thereof with female threads threadedly fitted on the threaded section 12 of the linear shaft 21. Thus, rotation of the first nut 11 by means of the linear driving motor A permits displacement of the linear shaft 21 in the axial direction thereof. Reference numeral 14 designates a second nut, which is arranged so as to act as a spline guide member and fitted on the spline section 13 of the linear shaft 21, to thereby permit the linear shaft 21 to carry out only linear motion without being rotated with the first nut 11. The second nut 14 is formed on an inner periphery thereof with a plurality of projections, which are fitted in the spline grooves constituting the spline section 13 so as to be slidable in the axial direction. In the illustrated embodiment, the second nut 14 is fixed in the bracket 27 through the encoder cover 15, resulting in being simplified in structure.

Reference numeral 7 designates the output shaft, which is constructed into a hollow structure and formed on an outer periphery thereof with a plurality of splines in a manner to extend in an axial direction thereof, resulting in providing a spline section 9. The spline section 9 of the output shaft 7 is fitted thereon with a third nut 8, which is securely fitted in a hollow portion of the shaft 3 of the rotary driving motor B. The third nut 8 is likewise formed on an inner periphery thereof with a plurality of projections, which are fitted in the spline grooves of the spline section 9 in a manner to be slidable in the axial direction, like the second nut 14. This permits the output shaft 7 to be moved in the axial direction with respect to the shaft 3 of the rotary driving motor B and rotated together with the shaft 3. The third nut 8 includes a nut body fitted on the spline section 9 and an annular flange 8a formed so as to radially outwardly extend from the body and positioned outside the shaft 3. Between the flange 8a and the end bracket 26 is arranged an oil seal member 32. Such arrangement of the oil seal member 32 by means of the third nut 3 facilitates mounting of the oil seal member 32.

In the linear/rotary actuator of the illustrated embodiment thus constructed, the output shaft 7 driven by the rotary driving motor B and the linear shaft 21 linearly moved by the linear driving motor A are rotated in relation to each other. More particularly, the output shaft 7 is rotatably fitted on a portion of the linear shaft 21 positioned at a central portion of the rotor 2 of the rotary driving motor B through radial bearings 19 and 20 while keeping the shafts 7 and 21 from being slid in relation to each other in the axial direction. Such construction permits the linear/rotary actuator to carry out both linear motion and rotary motion either concurrently or individually.

In the illustrated embodiment, first of all, when it is desired to permit the linear/rotary actuator to carry out only rotary motion, an excitation current is flowed through the coil 1c of the stator 1 of the rotary driving motor B to rotate the rotor 2 and shaft 3. This permits the output shaft 7 to be rotated through the third nut 8 fitted in the shaft 3 and the spline section 9. At this time, the linear shaft 21 is kept from being rotated due to the radial bearings 19 and 20 and due to fitted engagement between the spline section 13 and the second nut 14. This effectively prevents rotation between the first nut 11 and the threaded section 12 and therefore displacement of the linear shaft 21.

When the linear/rotary actuator is desired to carry out only linear motion, an excitation current is flowed through the coil 4c of the stator 4 of the linear driving motor A, so that the rotor 5 and shaft 6 may be rotated, leading to rotation of the first nut 11. The first nut 11 is kept engaged with the threaded section 12 and fitted engagement between the second nut 14 and the spline section 13 prevents rotation of the linear shaft 21, so that rotation of the first nut 11 leads to linear movement of the linear shaft 21. The radial bearings 19 and 20 keep the output shaft 7 from sliding in the axial direction with respect to the linear shaft 21. Also, the third nut 8 is fitted on the spline section 9, to thereby permit the output shaft 7 to be linearly moved with respect to the rotor 2 and shaft 3. Thus, the output shaft 7 can carry out linear motion with linear motion of the linear shaft 21.

When it is desired to carry out both linear motion and rotary motion, an excitation current is concurrently flowed through both the coil 4c of the stator 4 of the linear driving motor A and the coil 1c of the stator 1 of the rotary driving motor B. The output shaft 7 is rotatably fitted on the linear shaft 21, so that the output shaft 7 may be rotated independently in spite of the amount of linear motion of the linear shaft 21 and the linear shaft 21 may be linearly moved in spite of a speed of rotation of the output shaft 7. Thus, it will be noted that the illustrated embodiment permits linear motion and rotary motion to be carried out concurrently, as well as individually.

In the above-described operation, the amount of rotation of the output shaft 7 is detected by detecting the amount of rotation of the shaft 3 by means of the first encoder 10 and the amount of linear movement of the linear shaft 21 is directly detected by detecting the amount of rotation of the shaft 6 by means of the second encoder 16. The amount of rotation of the output shaft 7 and that of linear motion of the linear shaft 21 are controlled by means of a controller (not shown) which receives outputs of the encoders 10 and 16.

As described above, the linear/rotary actuator is so constructed that the output shaft 7 is rotatably fitted on the linear shaft 21. Such construction permits the actuator to carry out any desired operation and control. More specifically, the output shaft 7 attains rotary motion while being stopped at a predetermined position and controls rotary motion in asynchronism with linear motion.

In order that the linear/rotary actuator shown in FIG. 1 may be applied to a winding machine, the linear shaft 21 is formed with a wire guide though-hole 35 in a manner to extend therethrough in the axial direction thereof. Also, the output shaft 7 is formed on an outer end thereof with a wire outlet 36 in a manner to be aligned with the wire guide through-hole 35, through which a wire is discharged. Further, the encoder cover 15 is formed at a central portion thereof with a wire inlet 37 in a manner to be aligned with the wire guide through-hole 35, through which the wire is introduced into the linear shaft 21.

In the linear/rotary actuator of the illustrated embodiment, the intermediate bracket 28 is arranged between the end brackets 26 and 27 respectively constituting a part of the rotary driving motor B and linear driving motor A, resulting in constituting a part of each of the rotary driving motor B and linear driving motor A. Such construction of the illustrated embodiment significantly reduces the number of parts for the actuator and prevents an increase in whole length of the actuator in the axial direction thereof. Also, the intermediate bracket 28 is formed therein with the space 29 for receiving the first encoder 10 therein, to thereby eliminate a necessity of independently arranging the first encoder 10. This prevents a dimension or length of the actuator in the axial direction thereof from being increased, even when the two motors are linearly arranged in juxtaposition to each other and also the encoders are mounted on the motors. In addition, the second nut 14 acting as a slide guide member is fixed in the encoder cover 15, to thereby be fixed in the end bracket 27, resulting in a structure for fixing the second nut 14 being simplified. Further, the intermediate bracket 28 is provided with the lead wire lead-out section 31 through which the lead wires respectively extending from the linear driving motor A and rotary driving motor B are electrically led out, so that the lead wires may be led out at the single location by means of the intermediate bracket 28, to thereby facilitate external electrical connection of the lead wires. An output of the first encoder 10 arranged in the intermediate bracket 28 may be led out of the intermediate bracket 28 as well. An output of the second encoder 16 may be led out of the encoder cover 15.

Figure 3:
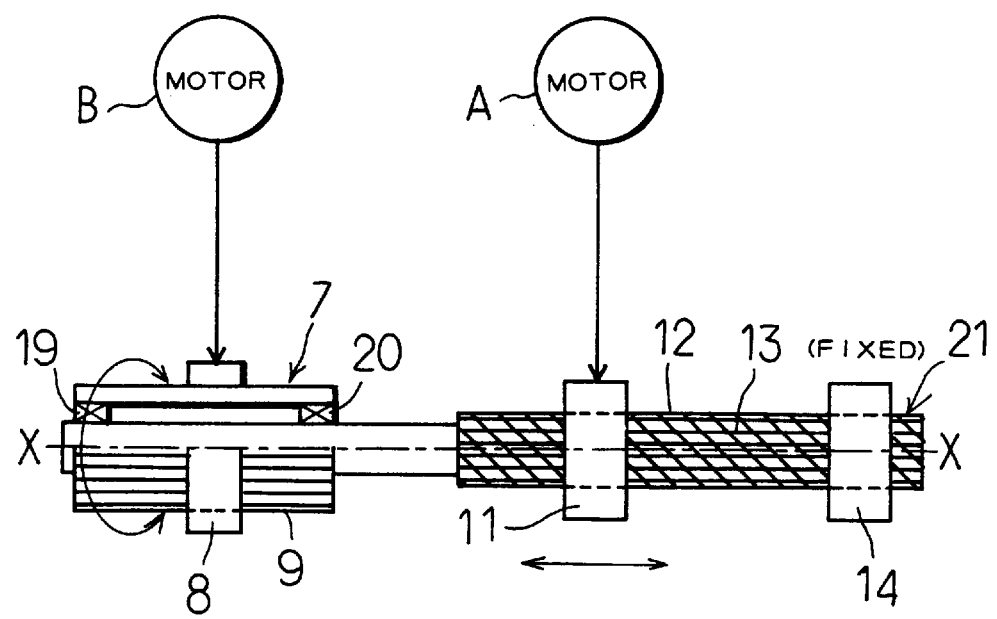
FIG. 3 is a schematic view showing another embodiment of a linear/rotary actuator according to the present invention.

Referring now to FIG. 3, another embodiment of a linear/rotary actuator according to the present invention is illustrated. A linear/rotary actuator of the illustrated embodiment is constructed in substantially the same manner as the embodiment described above, except that a spline section 13 and a threaded section 12 are overlappedly provided at the same location on an outer periphery of a linear shaft 21 so as not to interfere with each other. Such a structure is generally called "ball screw/spline". Such a "ball screw/spline" advantageously reduces a length of the linear shaft in an axial direction thereof.

Figure 4:
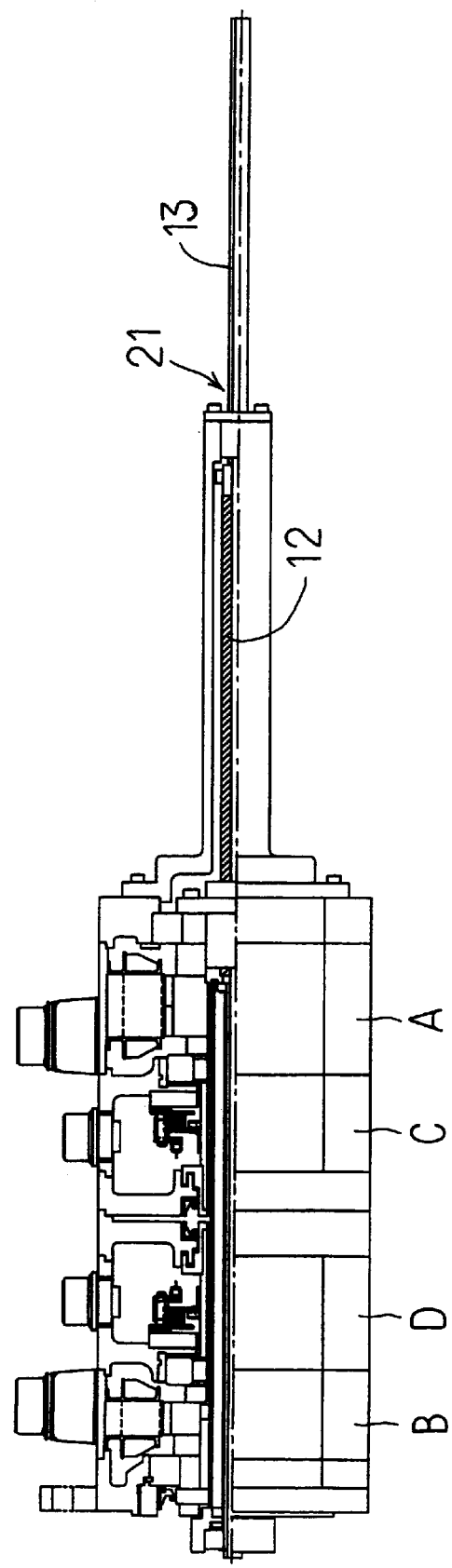
FIG. 4 is a schematic view showing a linear/rotary actuator actually designed according to the structure of FIG. 1.
Figure 5:
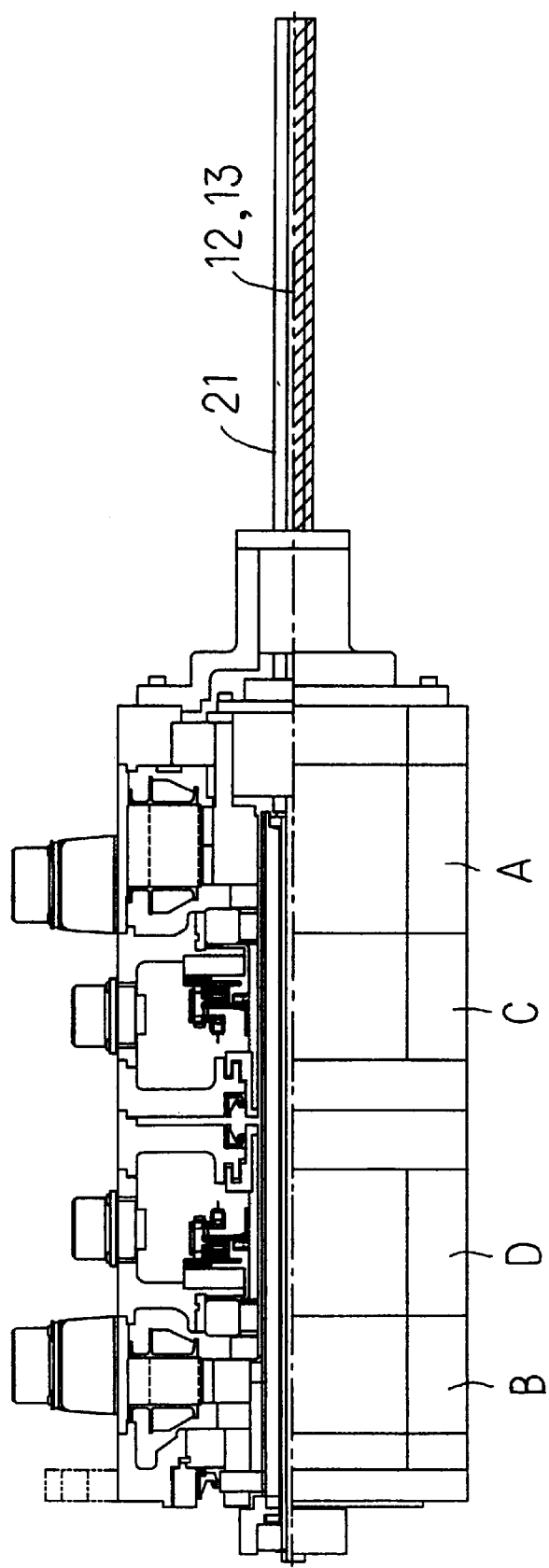
FIG. 5 is a schematic view showing a linear/rotary actuator actually designed according to the structure of FIG. 3.

The fact that the illustrated embodiment reduces a length of the linear/rotary actuator in an axial direction thereof as compared with the embodiment described above with reference to FIG. 1 is readily understood from FIGS. 4 and 5, wherein FIG. 4 shows a linear/rotary actuator actually designed according to the structure of FIG. 1 and FIG. 5 shows a linear/rotary actuator actually designed according to the structure of FIG. 1. Comparison therebetween indicates that the actuator shown in FIG. 5 using a "ball screw/spline" is decreased in length of a linear shaft 21 as compared with that of FIG. 4. In each of the linear/rotary actuators shown in FIGS. 4 and 5, encoders C and D respectively provided with respect to linear driving motor A and a rotary driving motor B are arranged between the linear driving motor A and the rotary driving motor B.

Figure 6:
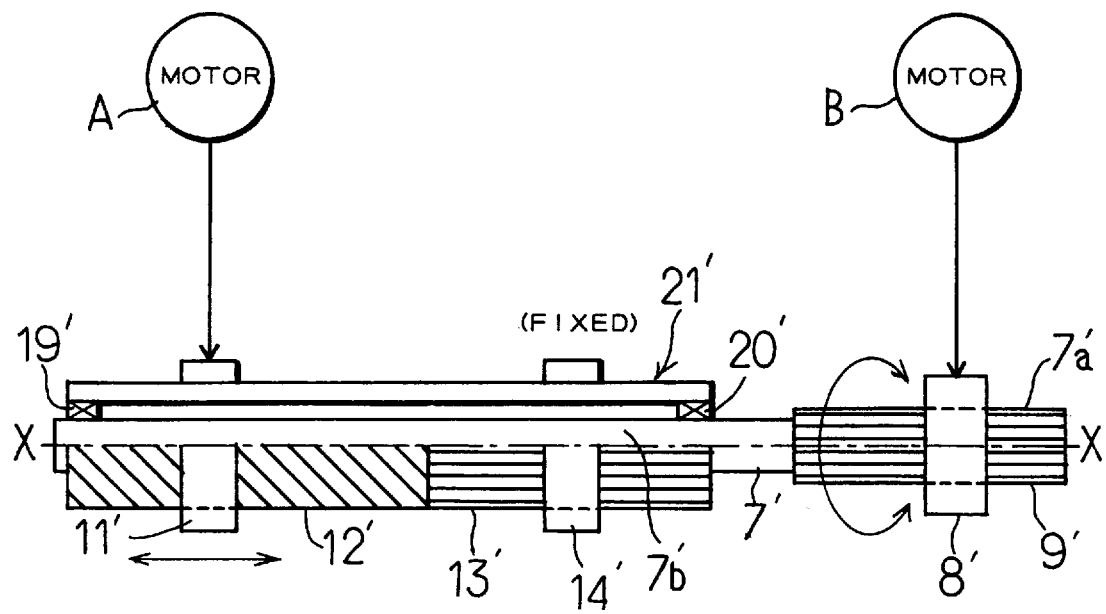
FIG. 6 is a schematic view showing a further embodiment of a linear/rotary actuator according to the present invention.

Referring now to FIG. 6, a further embodiment of a linear/rotary actuator according to the present invention is illustrated. In the illustrated embodiment, a linear shaft 21' is fitted on a part of an output shaft 7'. Thus, the linear shaft 21' is required to be hollow. The output shaft 7' includes a fit section 7'*b* fitted in the linear shaft 21' and an output section 7'*a* arranged outside the linear shaft 21' and formed on an outer periphery thereof with a spline section 9'. The fit section 7'*b* of the output shaft 7' is rotatably fitted in the linear shaft 21' through bearings 19' and 20'. Thus, the linear shaft 21' is coaxially fitted on the fit section 7'*b* of the output shaft 7' through the bearings 19' and 20' in a manner to be rotatable. The remaining part of the illustrated embodiment may be constructed in substantially the same manner as the embodiment shown in FIG. 1. When it is desired to lead out a wire through a central portion of the linear/rotary actuator, the output shaft 7' may be formed with a wire guide through-hole in a manner to extend through a central portion thereof.

Figure 7:
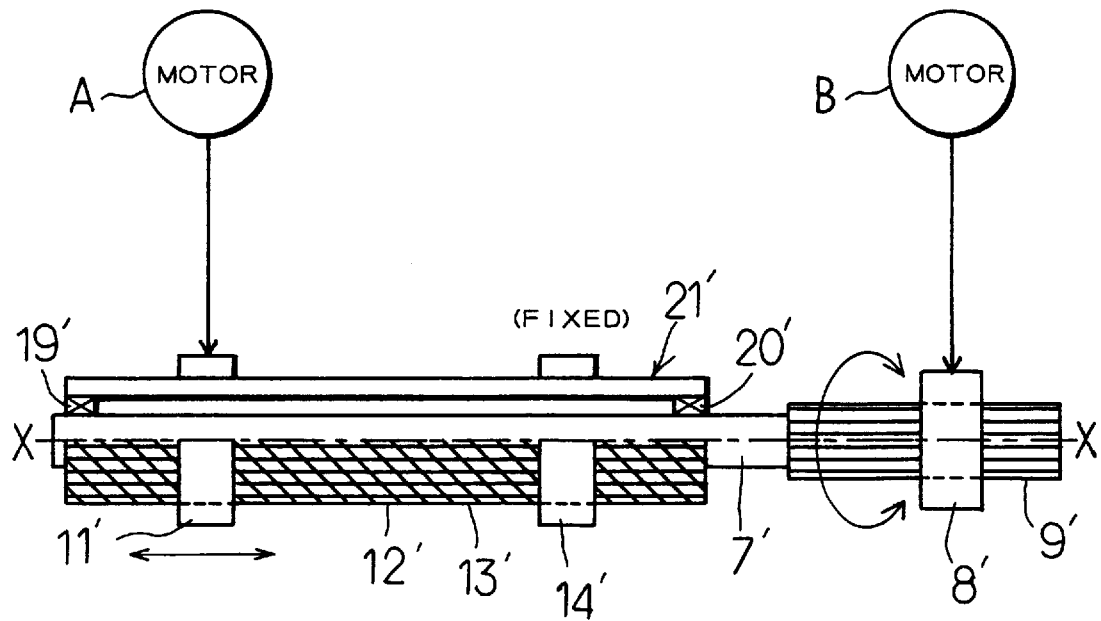
FIG. 7 is a schematic view showing a modification of the linear/rotary actuator of FIG. 6.

Referring now to FIG. 7, a modification of the linear/rotary actuator of FIG. 6 is illustrated. In the modification, a linear shaft 21' is formed on an outer periphery with a spline section 13' and a threaded section 12' in such a manner that the spline section 13' and threaded section 12' are overlappedly arranged on the same portion of the outer periphery so as not to interfere with each other. The remaining part of the modification may be constructed in substantially the same manner as shown in FIG. 6.

Figure 8:
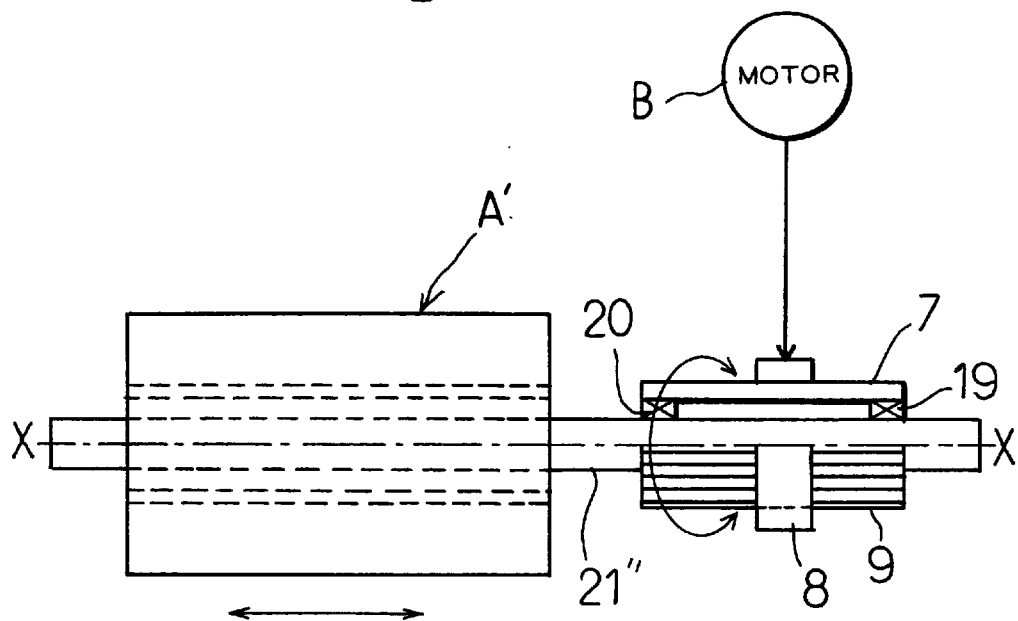
FIG. 8 is a schematic view showing a linear/rotary actuator of the present invention which has a linear motor of the cylinder type incorporated therein in the form of a linear driving motor.

Referring now to FIG. 8, still another embodiment of a linear/rotary actuator according to the present invention is illustrated. In a linear/rotary actuator of the illustrated embodiment, a linear driving motor A' is constituted of a linear motor of the cylinder type. A rotary driving motor B includes a shaft, which is constructed into a hollow structure. The linear motor A' includes a movable element acting as a linear shaft 21", which is arranged so as to be aligned with an axis X—X of the actuator and extend through a central portion of the rotary driving motor B. An output shaft 7 is likewise formed on an outer periphery thereof with a spline section 9 and constructed into a hollow structure. Also, the output shaft 7 is rotatably fitted on a portion of the linear shaft 21" positioned at a central portion of the shaft of the rotary driving motor B through bearings 19 and 20. The shaft of the rotary driving motor B is fixedly mounted therein with a nut 8, which is fitted on the spline section 9 of the output shaft 7.

Use of such a linear motor for the linear driving motor A' permits the linear shaft to be directly driven without using any spline section and threaded section, to thereby simplify a structure of the linear/rotary actuator. In particular, use of a linear motor of the cylinder type having a movable element arranged in a stator for this purpose permits the linear driving motor and rotary driving motor to be integrated together, resulting in the linear/rotary actuator being compacted in structure. Such linear motors of the cylinder type which may be commercially available include a linear stepping motor of the cylinder type sold under a designation "VEXTA" (registered trademark) "UCM420" by Oriental Motor Kabushiki Kaisha.

Figure 9:
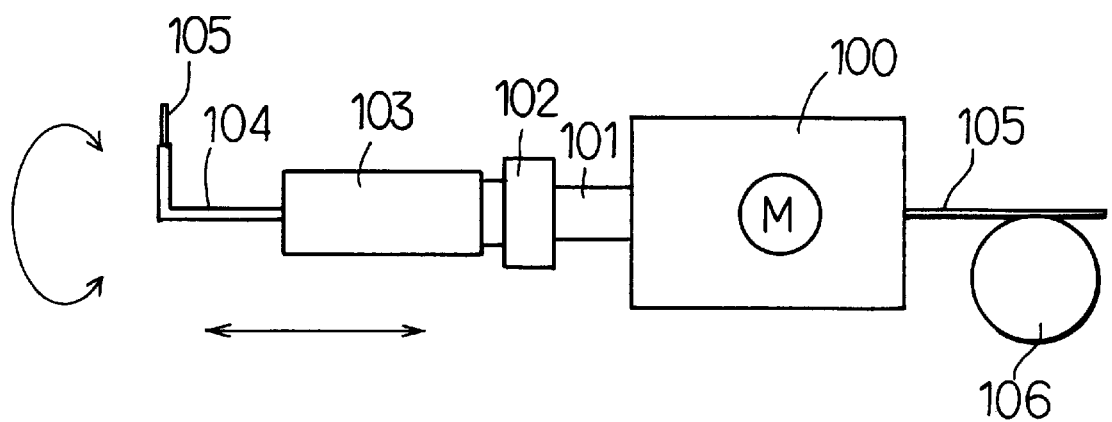
FIG. 9 is a schematic view showing an embodiment of a winding machine according to the present invention to which a linear/rotary actuator of the present invention is applied, wherein the linear/rotary actuator includes a rotary driving motor and a linear driving motor arranged so as to define an axis of the actuator by cooperation with each other as in the linear/rotary actuators shown in FIGS. 1 to 8.

Referring now to FIG. 9, yet another embodiment of a linear/rotary actuator according to the present invention is illustrated. A linear/rotary actuator of the illustrated embodiment which is generally designated at reference numeral 100 is applied to a winding machine by way of example. The linear/rotary 100 includes a rotary driving motor and a linear driving motor linearly arranged in juxtaposition to each other so as to define an axis X—X by cooperation with each other. The winding machine is constructed so as to support a pivotal nozzle holding mechanism 103 through a coupling 102 on an output shaft 101 of the linear/rotary actuator 100. The nozzle holding mechanism 103 has a wire feed nozzle 104 of a substantially L-shape supported thereon. In the illustrated embodiment, the wire feed nozzle 104 is constructed so as to feed a single wire from a distal end thereof. Alternatively, a wire feed nozzle may be of course used which is constructed so as to feed a plurality of wires from a distal end thereof. Reference numeral 106 designates a tension unit for applying tension to a wire fed from a wire reel (not shown) to the linear/rotary actuator 100. The linear/rotary actuator 100 is provided at a central portion thereof with a wire guide passage as in the linear/rotary actuator, to thereby eliminate a necessity of arranging any specific guide mechanism separately from the actuator. Also, the linear/rotary actuator 100 is compacted in structure because the two motors are integrated together, leading to small-sizing of the winding machine.

Figure 10:
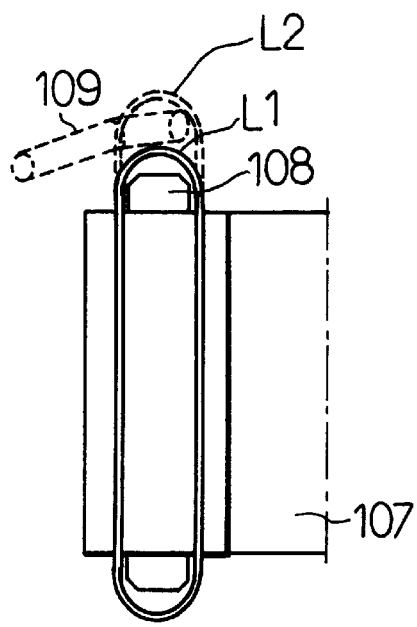
FIG. 10 is a diagrammatic view showing loci of motion of a nozzle by way of example which are obtained when a wire is wound on a laminated core of a motor or a generator by means of the winding machine shown in FIG. 9, to thereby constitute a wire wound section.

FIG. 10 shows loci of motion of the nozzle 104 by way of example which are obtained when a wire is wound on a laminated core 107 of a motor or a generator by means of the winding machine shown in FIG. 9, to thereby form a wire wound section. Reference numeral 108 designates an end home and 109 is a needle. A locus L1 indicated at solid lines in FIG. 10 is a locus of the nozzle 104 obtained during normal winding and a locus L2 indicated at broken lines is a locus thereof obtained during a crossover treatment. When a crossover is treated, the amount of linear motion is increased by ΔL, to thereby form a space into which the needle is inserted. Then, the crossover treatment is carried out by means of the needle 109. As will be noted from FIG. 10, the nozzle 104 basically carries out box motion constituted of linear motion and rotary motion. The linear/rotary actuator 100 of the illustrated embodiment permits linear motion and rotary motion to be controlled independently from each other, so that a wire wound section may be readily formed on a laminated core of any configuration and/or dimensions by merely varying a control mode of the linear driving motor and rotary driving motor. Thus, the winding machine of the present invention may accommodate to a variation in core on which a wire is to be wound, as compared with a conventional winding machine.

Figure 2:
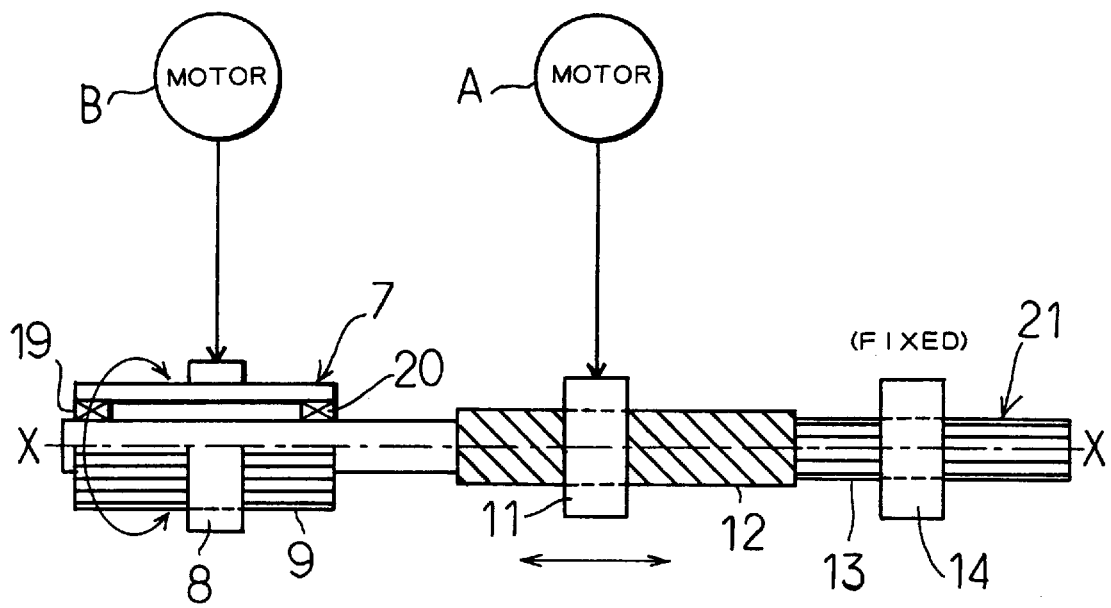
FIG. 2 is a schematic view conceptually showing the linear/rotary actuator of FIG. 1.
Figure 11:
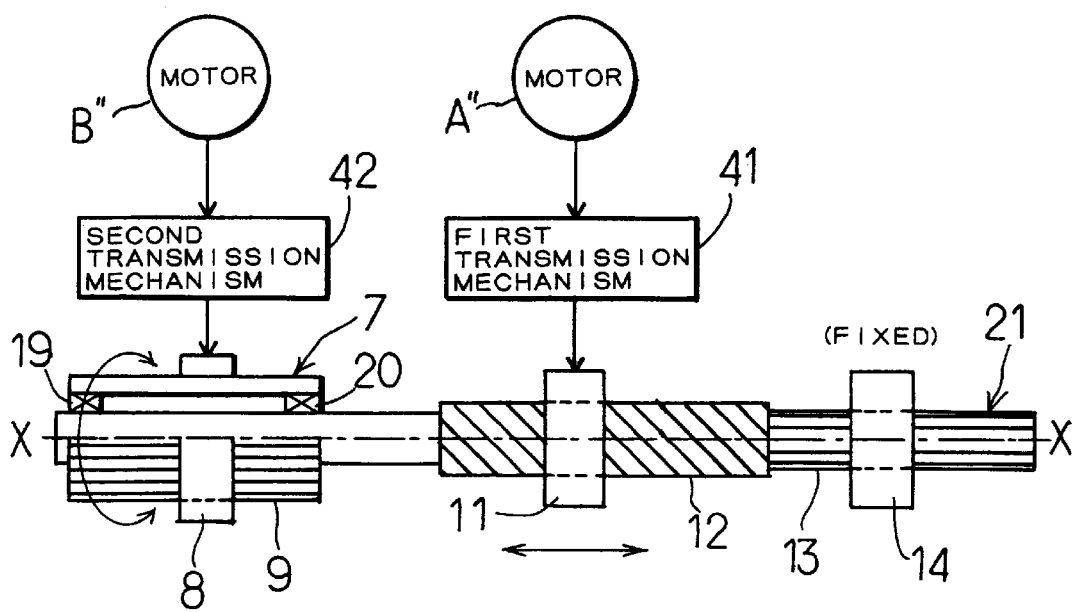
FIG. 11 is a schematic view showing a further embodiment of a linear/rotary actuator according to the present invention, which includes transmission mechanisms.

Also, the present invention may be applied to a linear/rotary actuator wherein driving force is transmitted from shafts of a rotary driving motor and a linear driving motor through transmission mechanisms to a linear shaft and an output shaft, respectively, as shown in FIG. 11 which illustrates a still further embodiment of the present invention. More specifically, a linear/rotary actuator of the illustrated embodiment includes a rotary driving motor B" and a linear driving motor A", wherein rotation of the linear driving motor A" is transmitted through a first transmission mechanism 41 to a first nut 11, to thereby linearly move a linear shaft 21 in an axial direction thereof. Rotation of the rotary driving motor B" is transmitted through a second transmission mechanism 42 to a third nut 8, to rotate an output shaft 7. The first transmission mechanism 41 and second transmission mechanism 42 each may be constituted by any suitable conventional transmission mechanism such as a combination of a pulley and a belt, a gear mechanism, or the like. The remaining part of the illustrated embodiment may be constructed in substantially the same manner as the embodiment shown in FIGS. 1 and 2. The illustrated embodiment may employ a ball screw/spline structure wherein a threaded section 12 and a spline section 13 are overlappedly formed, as in the embodiment shown in FIG. 3.

Figure 12:
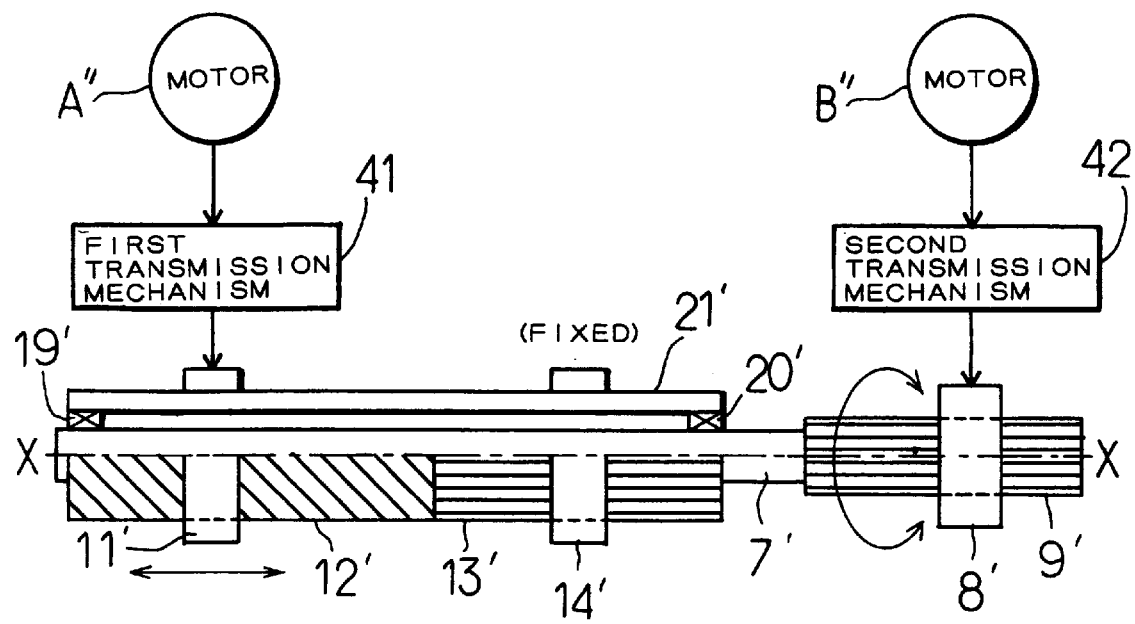
FIG. 12 is a schematic view showing still another embodiment of a linear/rotary actuator according to the present invention, which includes transmission mechanisms.

Referring now to FIG. 12, a still further embodiment of a linear/rotary actuator according to the present invention is illustrated. A linear/rotary actuator of the illustrated embodiment includes a structure wherein a linear shaft 21' is fitted on an end of an output shaft 7' through bearings 19' and 20' as in the embodiment of FIGS. 6 and 7, as well as a first transmission 41 and a second transmission mechanism 42 as in the embodiment of FIG. 11. In the illustrated embodiment as well, rotation of a linear driving motor A" is transmitted through the first transmission mechanism 41 to a first nut 11' to linearly move the linear shaft 21' in an axial direction thereof. Rotation of the a rotary driving motor B" is transmitted through the second transmission mechanism 42 to a third nut 8' to rotate the output shaft 7'. The remaining part of the illustrated embodiment may be constructed in substantially the same manner as the embodiment of FIGS. 6 and 7. Also, the illustrated embodiment may employ a ball screw/spline structure wherein a threaded section 12' and a spline section 13' are overlappedly formed, as in the embodiment shown in FIG. 3.

Figure 13:
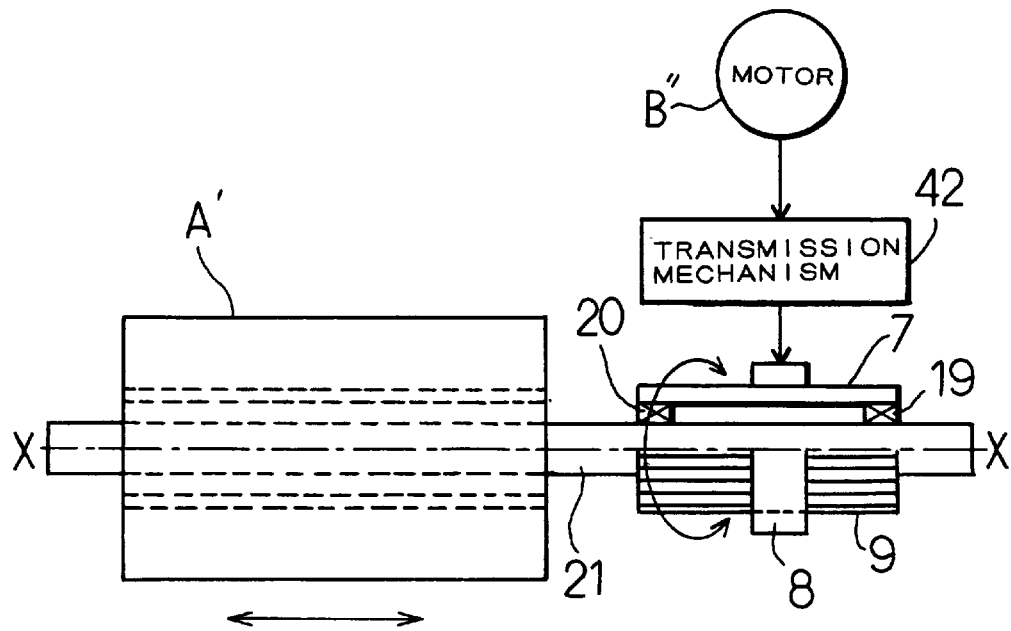
FIG. 13 is a schematic view showing a still further embodiment of a linear/rotary actuator according to the present invention, which includes a transmission mechanism.

When a linear motor A' is used for the linear driving motor, it is not required to arrange any transmission mechanism for the linear driving motor as shown in FIG. 13. It is merely required to arrange the transmission mechanism 42 on a side of the rotary driving motor B".

As can be seen from the foregoing, the linear/rotary actuator of the present invention carries out both rotary motion and linear motion either individually or concurrently as desired, to thereby be directed to a variety of applications.

Also, the winding machine of the present invention readily accommodates to a variation in a core on which a wire is to be wound as compared with the prior art.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A linear/rotary actuator comprising:

a linear shaft formed on an outer periphery thereof with a spline section and a threaded section;

a first nut threadedly fitted on said threaded section of said linear shaft;

a linear driving motor arranged so as to rotate said first nut directly or through a transmission mechanism to carry out linear motion of said linear shaft;

a second nut fitted on said spline of said linear shaft while being kept fixed;

an output shaft formed on an outer periphery thereof with a spline section and fitted on said linear shaft through bearings while being concentric with said linear shaft;

a third nut fitted on said spline section of said output shaft; and a rotary driving motor arranged so as to rotate said third nut directly or through a transmission mechanism to rotate said output shaft.

2. A linear/rotary actuator comprising:

an output shaft formed on an outer periphery thereof with a spline section;

a first nut, a second nut and a third nut;

said third nut being fitted on said spline section of said output shaft;

a rotary driving motor arranged so as to rotate said third nut directly or through a transmission mechanism to rotate said output shaft;

a linear shaft formed on an outer periphery thereof with a spline section and a threaded section and fitted on said output shaft through bearings while being concentric with said output shaft;

said first nut being threadedly fitted on said threaded section of said linear shaft; and a linear driving motor arranged so as to rotate said first nut directly or through a transmission mechanism to carry out linear motion of said linear shaft;

said second nut being fitted on said spline section of said linear shaft.

3. A linear/rotary actuator comprising:

a linear motor including a linear shaft acting as a movable element;

an output shaft formed on an outer periphery thereof with a spline section and fitted on said linear shaft through bearings while being concentric with said linear shaft;

a nut fitted on said spline section of said output shaft; and a rotary driving motor arranged so as to rotate directly or through a transmission mechanism to rotate said output shaft.

4. A linear/rotary actuator comprising:

a rotary driving motor and a linear driving motor arranged in juxtaposition to each other so as to be axially aligned with an axis of the linear/rotary actuator and each including a shaft;

an output shaft rotated about said axis due to rotation of said shaft of said rotary driving motor and linearly moved along said axis due to rotation of said shaft of said linear driving motor;

said shafts of said rotary driving motor and linear driving motor being constructed into a hollow structure;

a linear shaft formed on an outer periphery thereof with a spline section and a threaded section and arranged so as to be axially aligned with said shafts of said rotary driving motor and linear driving motor;

a first nut fitted on said threaded section of said linear shaft and rotated by means of said shaft of said linear driving motor to displace said linear shaft along said axis;

a second nut fitted on said spline section of said linear shaft to prevent rotation of said linear shaft while being kept fixed;

said output shaft being formed on an outer periphery thereof with a spline section and constructed into a hollow structure;

said output shaft being rotatably fitted on a portion of said linear shaft positioned at a central portion of said shaft of said rotary driving motor through bearings; and a third nut mounted in said shaft of said rotary driving motor and fitted on said spline section of said output shaft.

5. A linear/rotary actuator as defined in claim 4, wherein said spline section and threaded section of said linear shaft are overlappedly provided on an identical portion of said linear shaft so as not to interfere with each other.

6. A linear/rotary actuator as defined in claim 4 or 5, wherein said linear shaft is formed with a wire guide through-hole in a manner to extend therethrough in an axial direction thereof; and said output shaft is formed at an outer end thereof with a wire outlet in a manner to be aligned with said wire guide through-hole.

7. A winding machine comprising:

a wire feed nozzle; and a linear/rotary actuator as defined in claim 4;

said actuator being arranged so as to permit said wire feed nozzle to carry out linear motion and rotary motion.

8. A linear/rotary actuator comprising:

a rotary driving motor and a linear driving motor arranged in juxtaposition to each other so as to be axially aligned with an axis of the linear/rotary actuator and each including a shaft;

an output shaft rotated about said axis due to rotation of said shaft of said rotary driving motor and linearly moved along said axis due to rotation of said shaft of said linear driving motor;

said shafts of said rotary driving motor and linear driving motor being constructed into a hollow structure;

a linear shaft formed on an outer periphery thereof with a spline section and a threaded section and arranged so as to be axially aligned with said shafts of said rotary driving motor and linear driving motor;

a first nut fitted on said threaded section of said linear shaft and rotated through said shaft of said linear driving motor to displace said linear shaft along said axis;

a second nut fitted on said spline section of said linear shaft to prevent rotation of said linear shaft when it is kept fixed;

said output shaft including a fit section fitted in said linear shaft and an output section formed on an outer periphery thereof with a spline section and positioned outside said linear shaft;

said fit section of said output shaft being rotatably fitted in said linear shaft through bearings; and a third nut fixedly mounted on said shaft of said rotary driving motor and fitted on said spline section provided on said output section of said output shaft.

9. A linear/rotary actuator as defined in claim 8, wherein said spline section and threaded section of said linear shaft are overlappedly provided on an identical portion of said linear shaft so as not to interfere with each other.

10. A linear/rotary actuator as defined in claim 8 or 9, wherein said output shaft is formed therein with a wire guide through-hole in a manner to extend therethrough in an axial direction thereof.

11. A winding machine comprising:

a wire feed nozzle; and a linear/rotary actuator as defined in claim 8;

said actuator being arranged so as to permit said wire feed nozzle to carry out linear motion and rotary motion.

12. A linear/rotary actuator comprising:

a rotary driving motor and a linear driving motor arranged in juxtaposition to each other so as to be axially aligned with an axis of the linear/rotary actuator;

said linear driving motor including a shaft; and an output shaft rotated about said axis due to rotation of said shaft of said rotary driving motor and linearly moved along said axis by said linear driving motor;

said shaft of said rotary driving motor being constructed into a hollow structure;

said linear driving motor being constituted by a linear motor;

said linear motor including a linear shaft arranged so as to be aligned with said axis and extend through a central portion of said rotary driving motor;

said output shaft being formed on an outer periphery thereof with a spline section and constructed into a hollow structure;

said output shaft being rotatably fitted on a portion of said linear shaft positioned at a central portion of said shaft of said rotary driving motor through bearings;

said shaft of said rotary driving motor being fixedly mounted therein with a nut;

said nut being fitted on said spline section of said output shaft.

13. A linear/rotary actuator as defined in claim 12, wherein said linear motor is a cylinder-type linear motor.

14. A linear/rotary actuator comprising:

a pair of end brackets;

an intermediate bracket arranged between said end brackets;

a rotary driving motor including a stator arranged between one of said end brackets and said intermediate bracket;

a linear driving motor including a stator arranged between the other of said end brackets and said intermediate bracket;

said rotary driving motor including a rotor which has a hollow shaft rotatably supported in said one end bracket and intermediate bracket through a pair of bearings;

said linear driving motor including a rotor which has a hollow shaft rotatably supported in said the other end bracket and intermediate bracket through a pair of bearings;

a linear shaft formed on a portion of an outer periphery thereof positioned on a side of said linear driving motor with a spline section and a threaded section and arranged so as to be coaxially aligned with said shafts of said rotary driving motor and linear driving motor to define an axis of the linear/rotary actuator by cooperation therewith;

a first nut threadedly fitted on said threaded section of said linear shaft and rotated by means of said shaft of said linear driving motor to displace said linear shaft in an axial direction of the actuator;

a second nut securely arranged in said the other end bracket and fitted on said slide section of said linear shaft to prevent rotation of said linear shaft;

an output shaft constructed into a hollow structure and formed on an outer periphery thereof with a spline section;

said output shaft being rotatably fitted on a portion of said linear shaft positioned at a central portion of said rotor of said rotary driving motor through bearings so as not to be slid in relation to said linear shaft; and a third nut fixed in said shaft of said rotary driving motor and fitted on said spline of said output shaft.

15. A linear/rotary actuator as defined in claim 14, wherein said spline section and threaded section of said linear shaft are overlappedly arranged on an identical portion of said linear shaft so as not to interfere with each other.

16. A linear/rotary actuator as defined in claim 14, wherein said intermediate bracket is formed therein with a space in which a first encoder for detecting rotation of said rotor of said rotary driving motor is arranged;

said the other end bracket is fixedly mounted thereon with an encoder cover for receiving therein a second encoder for detecting rotation of said rotor of said linear driving motor;

said shaft of said rotary driving motor is mounted on an end thereof extending into said space with a rotary element for said first encoder;

said shaft of said linear driving motor is mounted on an end thereof extending into said encoder cover with a rotary element for said second encoder;

said second nut is fixed through said encoder cover on said the other end bracket; and said second nut includes a nut body loosely fitted in said shaft of said linear driving motor.

17. A linear/rotary actuator as defined in claim 14, wherein said intermediate bracket is provided with a lead wire lead-out section through which lead wires extending from said linear driving motor and rotary driving motor are electrically lead out.

18. A linear/rotary actuator as defined in claim 14, wherein said third nut includes a nut body fitted in said shaft of said rotary driving motor and fitted on said spline of said output shaft and a flange positioned outside said rotor and arranged so as to radially extend from said nut body;

further comprising an oil seal member arranged between said flange and said one end bracket.

19. A linear/rotary actuator comprising:

a rotary driving motor;

a linear driving motor including a shaft;

an output shaft rotated about axis of the actuator due to rotation of said rotary driving motor and linearly moved along said axis due to rotation of said shaft of said linear driving motor;

a linear shaft formed on an outer periphery thereof with a spline section and a threaded section and arranged so as to be axially aligned with said axis;

a first nut threadedly fitted on said threaded section of said linear shaft and rotated through a first transmission mechanism by means of said linear driving motor to displace said linear shaft along said axis;

a second nut fitted on said spline section of said linear shaft to prevent rotation of said linear shaft while being kept fixed;

said output shaft being formed on an outer periphery thereof with a spline section and constructed into a hollow structure;

said output shaft being rotatably fitted on said linear shaft through bearings; and a third nut being fitted on said spline section of said output shaft and rotated through a second transmission mechanism by means of said rotary driving motor.

20. A linear/rotary actuator as defined in claim 19, wherein said spline section and threaded section of said linear shaft are overlappedly provided on an identical portion of said linear shaft so as not to interfere with each other.

21. A linear/rotary actuator comprising:

a rotary driving motor and a linear driving motor;

an output shaft rotated about an axis of the actuator due to rotation of said rotary driving motor and linearly moved along said axis due to rotation of said linear driving motor;

a hollow linear shaft formed on an outer periphery thereof with a spline section and a threaded section and arranged so as to be axially aligned with said axis;

a first nut threadedly fitted on said threaded section of said linear shaft and rotated through a first transmission mechanism by means of said linear driving motor to displace said linear shaft along said axis;

a second nut fitted on said spline section of said linear shaft to prevent rotation of said linear shaft while being kept fixed;

said output shaft including a fit section fitted in said linear shaft and an output section positioned outside said linear shaft and formed on an inner periphery thereof with a spline section;

said fit section of said output shaft being rotatably fitted in said linear shaft through bearings; and a third nut fitted on said spline section of said output section of said output shaft and rotated through a second transmission mechanism by means of said rotary driving motor.

22. A linear/rotary actuator as defined in claim 21, wherein said spline section and threaded section of said linear shaft are overlappedly provided on an identical portion of said linear shaft so as not to interfere with each other.

23. A linear/rotary actuator comprising:

a rotary driving motor and a linear driving motor;

an output shaft rotated about an axis of the actuator by means of said rotary driving motor and linearly moved along said axis by means of said linear driving motor;

said linear driving motor being constituted by a linear motor;

said linear motor including a linear shaft so as to be axially aligned with said axis;

said output shaft being formed on an outer periphery thereof with a spline section and constructed into a hollow structure;

said output shaft being rotatably fitted on an end of said linear shaft through bearings; and a nut fitted on said spline of said output shaft and rotated through a transmission mechanism by means of said rotary driving motor.

* * * * *